(12) United States Patent
Burroughs

(10) Patent No.: US 9,031,575 B2
(45) Date of Patent: *May 12, 2015

(54) POSITIONING OF A WIRELESS DEVICE SERVED BY A FEMTO CELL

(71) Applicant: QUALCOMM Incorporated, San Diego, CA (US)

(72) Inventor: Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/190,600

(22) Filed: Feb. 26, 2014

(65) Prior Publication Data

US 2014/0179350 A1 Jun. 26, 2014

Related U.S. Application Data

(63) Continuation of application No. 12/783,923, filed on May 20, 2010, now Pat. No. 8,700,051.

(60) Provisional application No. 61/180,511, filed on May 22, 2009.

(51) Int. Cl.
| | |
|---|---|
| *H04W 4/02* | (2009.01) |
| *H04W 64/00* | (2009.01) |
| *H04W 84/04* | (2009.01) |

(52) U.S. Cl.
CPC .............. *H04W 4/023* (2013.01); *H04W 64/00* (2013.01); *H04W 84/045* (2013.01)

(58) Field of Classification Search
USPC ........ 455/404.2, 422.1, 435.1–436, 440, 444, 455/456.1–456.6, 561, 562.1
See application file for complete search history.

(56) References Cited

U.S. PATENT DOCUMENTS

| | | | |
|---|---|---|---|
| 6,097,959 A * | 8/2000 | Yost et al. ................. | 455/456.2 |
| 8,700,051 B2 * | 4/2014 | Burroughs ................ | 455/456.1 |

(Continued)

FOREIGN PATENT DOCUMENTS

| | | |
|---|---|---|
| EP | 2180756 A1 | 4/2010 |
| JP | 2003289306 A | 10/2003 |

(Continued)

OTHER PUBLICATIONS

International Search Report and Written Opinion—PCT/US2010/035794, International Search Authority—European Patent Office—Aug. 26, 2010.
Taiwan Search Report—TW099116364—TIPO—Mar. 4, 2013.

*Primary Examiner* — Kashif Siddiqui
(74) *Attorney, Agent, or Firm* — Mary A. Fales; Thomas A. Jolly

(57) ABSTRACT

Techniques for supporting positioning are described. In an aspect, positioning of mobile stations served by femto cells may be supported by having the femto cells transmit at least one identity used to differentiate the femto cells from other cells/sectors in a wireless network. The at least one identity may also convey certain information for the femto cells, which may be pertinent for positioning of the mobile stations. In one design, a femto cell may send the at least one identity assigned to the femto cell and the location of the femto cell to mobile stations as an aid for positioning. A mobile station may receive and forward the least one identity and the location of the femto cell to a location server. The mobile station and the location server may then perform positioning based on the at least one identity and the location of the femto cell.

30 Claims, 8 Drawing Sheets

(56) References Cited

U.S. PATENT DOCUMENTS

| | | |
|---|---|---|
| 2003/0217168 A1 | 11/2003 | Adachi et al. |
| 2004/0048597 A1* | 3/2004 | Khushu et al. ............ 455/404.2 |
| 2005/0020309 A1* | 1/2005 | Moeglein et al. ............ 455/561 |
| 2008/0188243 A1* | 8/2008 | Giustina et al. ............ 455/456.6 |
| 2009/0098873 A1* | 4/2009 | Gogic ............................ 455/436 |
| 2009/0312034 A1* | 12/2009 | Burroughs et al. ........ 455/456.1 |
| 2010/0120447 A1* | 5/2010 | Anderson et al. .......... 455/456.1 |
| 2010/0240397 A1* | 9/2010 | Buchmayer et al. ....... 455/456.1 |
| 2010/0298008 A1 | 11/2010 | Burroughs |
| 2011/0201349 A1* | 8/2011 | Castillo et al. ............ 455/456.1 |

FOREIGN PATENT DOCUMENTS

| | | |
|---|---|---|
| JP | 2003304246 A | 10/2003 |
| JP | 2005184594 A | 7/2005 |
| JP | 2005189154 A | 7/2005 |
| JP | 2009049485 A | 3/2009 |
| JP | 2010529716 A | 8/2010 |
| WO | WO-03081930 | 10/2003 |
| WO | WO-2008025013 | 2/2008 |
| WO | WO-2009039904 | 4/2009 |
| WO | WO-2009049197 A2 | 4/2009 |
| WO | WO-2009058068 | 5/2009 |

* cited by examiner

POSITIONING OF A WIRELESS DEVICE SERVED BY A FEMTO CELL

CLAIM OF PRIORITY UNDER 35 U.S.C. §119

The present application is a continuation of Non-provisional U.S. application Ser. No. 12/783,923, entitled "Positioning of a Wireless Device Served by a Femto Cell," filed May 20, 2010, which claims the benefit of Provisional U.S. Application Ser. No. 61/180,511, entitled "Positioning of a Wireless Device Served by a Femto Cell," filed May 22, 2009, both have been assigned to the assignee hereof. The aforementioned United States applications are hereby incorporated by reference in their entirety.

BACKGROUND

1. Field

The present disclosure relates generally to communication, and more specifically to techniques for supporting positioning of wireless devices, which may be referred to as mobile stations.

2. Background

It is often desirable, and sometimes necessary, to know the location of a mobile station (MS), e.g., a cellular phone. The terms "location" and "position" are synonymous and are used interchangeably herein. For example, a user may utilize the mobile station to browse through a website and may click on location sensitive content. The location of the mobile station may then be determined and used to provide appropriate content to the user. There are many other scenarios in which knowledge of the location of the mobile station is useful or necessary.

A mobile station may communicate with various types of cells such as macro cells, femto cells, etc. The term "cell" can refer to a station that supports radio communication or the coverage area of the station, depending on the context in which the term is used. Macro cells are typically supported by fixed base stations placed at known locations. In contrast, femto cells are typically supported by movable home base stations or access points that may be deployed at any location. It may be desirable to support positioning of the mobile station when communicating with femto cells.

SUMMARY

Techniques for supporting positioning of mobile stations communicating with femto cells are described herein. In an aspect, positioning of mobile stations served by femto cells may be supported by having the femto cells transmit at least one identity used to differentiate the femto cells from other cells/sectors in a wireless network. The at least one identity may also convey certain information for the femto cells, which may be pertinent for positioning of the mobile stations.

In one design, a femto cell may determine its location, e.g., based on signals from satellites. The femto cell may also determine at least one identity assigned to the femto cell and used to differentiate the femto cell from cells/sectors in a wireless network. The at least one identity may comprise an identity having (i) a value within a range of values reserved for femto cells or (ii) a value within one of multiple ranges of values, with each range of values being reserved for femto cells of a different type. The femto cell may send the at least one identity and its location (e.g., in an overhead message) to at least one mobile station as an aid for positioning.

In one design, a mobile station may obtain the at least one identity and the location of the femto cell (e.g., from the overhead message). The mobile station may send the at least one identity and the location of the femto cell to a location server. The mobile station may thereafter perform positioning with the location server to obtain a location estimate for the mobile station. For example, the mobile station may receive the location estimate or assistance data, which may be determined by the location server based on the location of the femto cell and knowledge of the femto cell and possibly the femto cell type.

In one design, the location server may receive the at least one identity and the location of the femto cell from the mobile station. The location server may differentiate the femto cell from cells/sectors in the wireless network based on the at least one identity of the femto cell. The location server may perform positioning for the mobile station with knowledge of the femto cell and possibly the femto cell type and further based on the location of the femto cell, as described below.

Various aspects and features of the disclosure are described in further detail below.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, Long Term Evolution (LTE) networks, WiMAX (IEEE 802.16) networks, wireless local area networks (WLANs), etc. The terms "network" and "system" are often used interchangeably. A CDMA network may implement a radio technology such as cdma2000, Universal Terrestrial Radio Access (UTRA), etc. cdma2000 covers CDMA 1X and High Rate Packet Data (HRPD). UTRA includes Wideband CDMA (WCDMA) and other variants of CDMA. A TDMA network may implement a radio technology such as Global System for Mobile Communications (GSM), General Packet Radio Service (GPRS), etc. An OFDMA network may implement a radio technology such as Evolved UTRA (E-UTRA), Ultra Mobile Broadband (UMB), IEEE 802.16 (WiMAX), IEEE 802.20, Flash-OFDM®, etc. A WLAN may implement a radio technology such as IEEE 802.11 (Wi-Fi), Hiperlan, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, GSM and GPRS are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for 3GPP2 networks.

Figure 1:
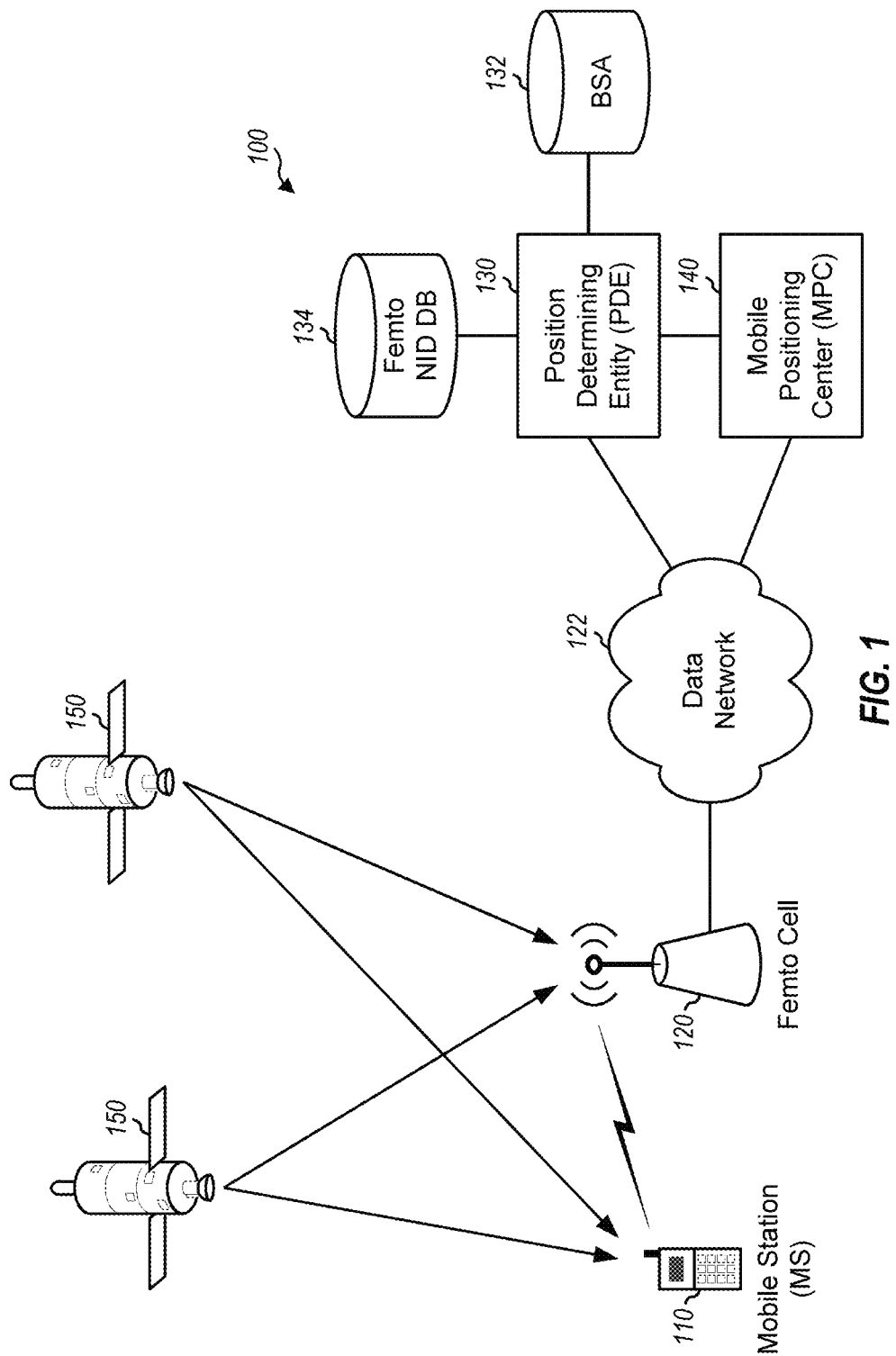
FIG. 1 shows an exemplary wireless network.

FIG. 1 shows an exemplary 3GPP2 network 100, which supports positioning and location-based services (LBS). A mobile station (MS) 110 may communicate with a femto cell 120 to obtain communication services. Mobile station 110 may be stationary or mobile and may also be referred to as a user equipment (UE), a terminal, an access terminal (AT), a subscriber station, a station (STA), etc. Mobile station 110 may be a cellular phone, a personal digital assistant (PDA), a handheld device, a wireless device, a laptop computer, a wireless modem, a cordless phone, a telemetry device, a tracking device, etc.

Femto cell 120 may support radio communication for mobile stations within its coverage. Femto cell 120 may be part of and/or may be referred to as a home or femto access point, a home or femto base station, a home or femto Node B, a home or femto evolved Node B (eNB), etc. Femto cell 120 may support one or more radio technologies such as CDMA 1X and/or HRPD in 3GPP2. Alternatively or additionally, femto cell 120 may support WCDMA, GSM, GPRS, LTE, Wi-Fi, WiMAX, etc. Femto cell 120 may be a serving cell/sector for mobile station 110.

Mobile station 110 and femto cell 120 may each receive and measure signals from satellites 150 to obtain pseudoranges for the satellites. The satellites may be part of the United States Global Positioning System (GPS), the European Galileo system, the Russian GLONASS system, the Japanese Quasi-Zenith Satellite System (QZSS), the Chinese Compass/Beidou system, the Indian Regional Navigational Satellite System (IRNSS), some other satellite positioning system (SPS), or a combination of these systems. The pseudoranges and the known locations of the satellites may be used to derive a location estimate for mobile station 110 or femto cell 120. A location estimate may also be referred to as a position estimate, a position fix, etc. Mobile station 110 may also receive and measure signals from femto cell 120 and/or other base stations in a wireless network to obtain timing and/or signal strength measurements. The timing and/or signal strength measurements and the known locations of the base stations may be used to derive a location estimate for mobile station 110. In general, a location estimate may be derived based on measurements for satellites, base stations, pseudolites, and/or other transmitters and using one or a combination of positioning methods.

A data network 122 may support communication between femto cell 120 and other network entities in 3GPP2 network 100. Data network 122 may include part of a core network for 3GPP2 network 100. Data network 122 may also include part of a wireline network, which may be a telephone network, a DSL network, a cable network, the Internet, etc.

A position determining entity (PDE) 130 may support positioning for mobile stations. Positioning refers to a process to determine, e.g., a geographic or civil location estimate for a target device. Positioning may provide (i) latitude, longitude, and possibly altitude coordinates and an uncertainty for a geographic location estimate or (ii) a street address for a civil location estimate. Positioning may also provide velocity and/or other information. PDE 130 may exchange messages with mobile stations to support positioning, calculate location estimates, support delivery of assistance data to the mobile stations, perform functions for security, etc. A database 132 may store a base station almanac (BSA) containing information for cells/sectors and base stations in 3GPP2 network 100. The BSA may be used to assist positioning of mobile stations. A database (DB) 134 may store information for femto cells, as described below.

A mobile positioning center (MPC) 140 may perform various functions for location services. For example, MPC 140 may support subscriber privacy, authorization, authentication, roaming support, charging/billing, service management, position calculation, etc.

FIG. 1 shows some network entities in 3GPP2 network 100, which may include other network entities not shown in FIG. 1. The network entities in FIG. 1 may have equivalent network entities in a 3GPP network or some other network. For example, PDE 130 may be equivalent to a Serving Mobile Location Center (SMLC) in a 3GPP network or a Secure User Plane Location (SUPL) Positioning Center (SPC) defined by Open Mobile Alliance (OMA). MPC 140 may be equivalent to a Gateway Mobile Location Center (GMLC) in a 3GPP network or a SUPL Location Center (SLC) in OMA. PDE 130 may also be referred to as a location server, and MPC 140 may also be referred to as a location center.

3GPP2 network 100 may include a number of base stations, which are not shown in FIG. 1 for simplicity. In 3GPP2, the overall coverage area of a base station may be referred to as a macro cell (or simply, a cell) and may be partitioned into multiple (e.g., three) sectors. Each sector may be the smallest coverage area of the base station. In 3GPP, the coverage area of a base station may be partitioned into multiple (e.g., three) cells, and each cell may be the smallest coverage area of the base station. A sector in 3GPP2 may thus be equivalent to a cell in 3GPP. For clarity, the term "sector" is used in much of the description below.

In 3GPP2, a sector may be identified by a combination of a System Identification (SID), a Network Identification (NID), and a Base Station Identification (BASE_ID). The SID identifies a cellular system of a network operator in a specific region. The NID identifies a smaller network within the cellular system. The BASE_ID may be composed of a CELL_ID and a SECTOR_ID assigned to the sector. In GSM, a cell may be identified by a Mobile Country Code (MCC), a Mobile Network Code (MNC), a Location Area Code (LAC), and a Cell Identity (CID). In WCDMA, a cell may be identified by an MCC, an MNC, a Radio Network Controller Identity (RNC-ID), and a CID. In general, the techniques described herein may be used with any set of identities used to identify a sector or a cell. The terms "identity" and "identifier" are used interchangeably herein. For clarity, much of the description below is for the SID, NID, and BASE_ID used in 3GPP2.

Each sector in 3GPP2 network 100 may broadcast a System Parameters Message or an Extended System Parameters Message to mobile stations within its coverage. For clarity, the description below assumes the use of the System Parameters Message. The System Parameters Message from a given sector may include pertinent information such as the SID, NID and BASE_ID assigned to the sector, the latitude and longitude of a base station for the sector, etc. The SID and NID may be used to (i) identify the smaller network currently serving a mobile station and (ii) determine whether the mobile station is roaming. The SID, NID and BASE_ID may be used to identify the sector currently serving the mobile station.

3GPP2 network 100 may maintain a BSA for sectors and/or base stations in the network. The BSA may contain a number of records, and each record may describe a sector or a base station in the network. Each record may include information that may be pertinent for positioning. For example, a record for a sector may include information for the SID, NID and BASE_ID of the sector, the location (latitude, longitude, and altitude) of an antenna for the sector, the sector center, a maximum antenna range (MAR), antenna parameters, terrain information, frequency, etc. The SID, NID and BASE_ID of the sector may be used to look up and retrieve a record in the BSA for the sector. The information in the record may be used to support positioning of mobile stations communicating with the sector.

The BSA may be used to support network-based positioning methods such as Advanced Forward Link Trilateration (A-FLT), Enhanced Observed Time Difference (E-OTD), Observed Time Difference Of Arrival (OTDOA), Enhanced Cell Identity (ID), Cell ID, etc. For example, a sector antenna location may be used for triangulation to determine the location of a mobile station using the A-FLT, E-OTD, and OTDOA methods. The sector center may be used as a coarse location estimate for the mobile station for the Enhanced Cell ID and Cell ID methods. The BSA may also be used to support satellite-based positioning methods such as GPS, assisted GPS (A-GPS), etc. The term "GPS" generically refers to any SPS in the description herein. For example, information for the serving sector of the mobile station may be used to obtain a coarse location estimate, which may in turn be used to provide appropriate GPS assistance data to the mobile station.

3GPP2 network 100 may also support a large number of femto cells, which may be deployed at various locations selected by users. The femto cells may be fully functional base stations that can provide radio coverage for mobile stations. The femto cells may be deployed to provide local radio coverage within small regions, typically 50 meters or less. The users may attempt to use LBS applications while served by the femto cells. However, the femto cells may not be populated in the BSA. The lack of a BSA record for a femto cell may break a fundamental assumption of LBS architectures in that the network has a priori knowledge of the locations of the base stations. This a priori knowledge of the base station locations may serve multiple purposes for positioning, as described. For example, a base station location may serve as an initial location estimate and as a seed for A-GPS.

In an aspect, positioning for mobile stations served by femto cells may be supported by having the femto cells transmit (e.g., broadcast) at least one identity used to differentiate the femto cells from sectors in a wireless network. For each of the at least one identity, a range of values may be reserved for assignment to the femto cells. The femto cells may then be identified by their identity values being within the reserved range of values. The at least one identity may also convey certain information for the femto cells, which may be pertinent for positioning of mobile stations.

In one design that is applicable for 3GPP2, the femto cells may be identified through the NID. The SID of the femto cells may be the same as the SID of sectors in the same region. The femto cells may be assigned a range of NID values that may be different from the NID values assigned to the sectors in the same region. The femto cells may thus be distinguished from the sectors based on the NID values assigned to the femto cells. The processing for positioning may be different for the femto cells and the sectors, and the appropriate positioning processing may be dependent on the ability to differentiate the femto cells from the sectors based on the NID values.

There may be several types or classes of femto cells, which may have different effective ranges, different transmit power levels, etc. In one design, different femto cell types may be identified through the use of different ranges of NID values, e.g., one range for each femto cell type. A femto cell may be assigned a NID value within the range for that femto cell's type. The femto cell type may then be determined based on the range within which the NID value assigned to the femto cell falls. A designated entity (e.g., a network operator) may assign suitable SID, NID and BASE_ID values to the femto cells such that nearby femto cells are assigned unique (SID, NID, and BASE_ID) values.

Femto NID database 134 in FIG. 1 may store a set of entries/records for NID values reserved for femto cells, e.g., one entry for each femto cell type. In one design, each entry may include the three parameters listed in Table 1. The entry for each femto cell type may include NID_min, NID_max, and MAR. NID_min is a minimum NID value allowed for femto cells of a particular type and may be within a range of Q to 65,535, where Q may be defined by a network operator and 65,535 is the largest possible value for a 16-bit NID. NID_max is a maximum NID value allowed for the femto cells of the particular type and may be within a range of NID_min to 65,535. MAR is the maximum antenna range of the femto cells of the particular type and may be used for positioning of mobile stations, as described below.

TABLE 1

One Entry in Femto NID Database

| Parameter | Valid Range | Description |
| --- | --- | --- |
| NID_min | Q to 65535 | Minimum NID value for femto cells of type k |
| NID_max | NID_min to 65535 | Maximum NID value for femto cells of type k |
| MAR | 0 to 10000 meters | Maximum antenna range (MAR) for femto cells of type k |

Table 2 shows a set of K entries in femto NID database 134. In general, femto NID database 134 may include any number of entries for any number of femto cell types. In one design, femto NID database 134 may include up to 50 entries, although fewer or more entries may also be supported. The K NID ranges for the K entries may be non-overlapping, so that each NID value is covered by at most one entry. In one design, the entries in femto NID database 134 may be sorted, e.g., so that the NID ranges ascend in the database. The sorted NID ranges may expedite look up (e.g., binary search) to determine whether a given NID value is present in femto NID database 134.

TABLE 2

K Entries in Femto NID Database

| Entry | Minimum NID | Maximum NID | MAR |
| --- | --- | --- | --- |
| 1 | NID_min(1) | NID_max(1) | MAR(1) |
| 2 | NID_min(2) | NID_max(2) | MAR(2) |
| . | . | . | . |
| k | NID_min(k) | NID_max(k) | MAR(k) |
| . | . | . | . |
| K | NID_min(K) | NID_max(K) | MAR(K) |

In the design shown in Table 1, the NID may convey a MAR of a femto cell. The NID may also convey other parameters for a femto cell.

In one design, femto NID database 134 may be maintained separately from BSA database 132, as shown in FIG. 1. In another design, femto NID database 134 may be part of BSA database 132. In any case, femto NID database 134 may be updated, e.g., dynamically.

Figure 2:
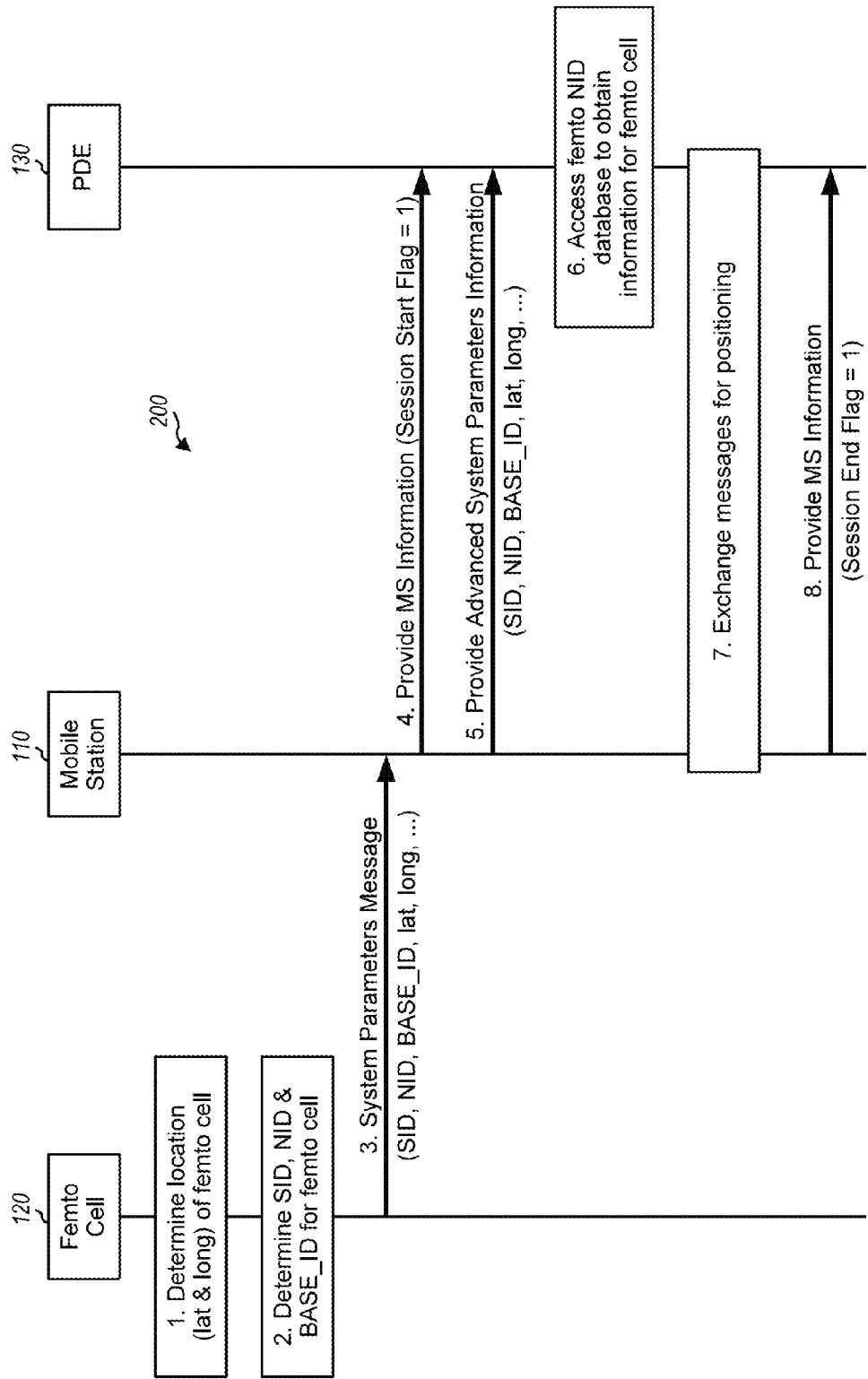
FIG. 2 shows a call flow for positioning a mobile station served by a femto cell.

FIG. 2 shows a design of a call flow 200 for positioning of mobile station 110 served by femto cell 120. Femto cell 120 may include a GPS receiver (e.g., like a normal base station) and may be able to determine its location, e.g., using GPS or A-GPS (step 1). Femto cell 120 may determine its location when it is first powered on in order to verify that it can transmit at its current location. Femto cell 120 may also periodically determine its location in order to confirm that it can continue to transmit. Femto cell 120 may also determine the SID, NID and BASE_ID assigned to the femto cell (step 2). The NID assigned to femto cell 120 may be within a range of NID values reserved for a femto cell type of femto cell 120.

Femto cell 120 may periodically broadcast a System Parameters Message to mobile stations within its coverage (step 3). This message may include the SID, NID and BASE_ID assigned to femto cell 120, the latitude (lat) and longitude (long) of femto cell 120, and possibly other information. Mobile station 110 may receive the System Parameters Message from femto cell 120 and may extract the identification and location information for femto cell 120. Mobile station 110 may communicate with femto cell 120 to obtain various communication services, e.g., voice, data, broadcast, etc.

Mobile station 110 may decide to perform positioning to obtain a location estimate for itself. Mobile station 110 may communicate with PDE 130 via femto cell 120 for positioning. For simplicity, femto cell 120 is omitted in the communication between mobile station 110 and PDE 130 in the description. Mobile station 110 may send an IS-801 Provide MS Information message to PDE 130 (step 4). This message may include positioning capabilities of mobile station 110 and a Session Start flag set to 1 to start a location session. Mobile station 110 may also send an IS-801 Provide Advanced System Parameters Information message to PDE 130 (step 5). This message may include the SID, NID and BASE_ID of femto cell 120, the latitude and longitude of femto cell 120, etc.

Femto cells may not be populated in BSA database 132 because there may be too many femto cells to manage. Instead, the information in the Provide Advanced System Parameters Information message may be used to determine the femto cell location. This message may provide only the latitude and longitude of femto cell 120. The MAR of femto cell 120 may be needed to allow for normal positioning processing. A MAR value may be associated with a range of NID values indicating a femto cell and its type, e.g., as shown in Table 1.

PDE 130 may access femto NID database 134 with the NID value reported by mobile station 110 and may obtain information (e.g., the MAR) for femto cell 120 from the database (step 6). PDE 130 and mobile station 110 may then exchange messages for positioning (step 7). Different sets of messages may be exchanged for MS-assisted and MS-based positioning in step 7. For both MS-assisted and MS-based cases, positioning may be performed based on the latitude and longitude of femto cell 120 obtained from the Provide Advanced System Parameters Information message and the MAR obtained from femto NID database 134. After completing positioning, mobile station 110 may send a Provide MS Information message to PDE 130 (step 8). This message may have a Session End flag set to 1 to terminate the location session.

Figure 3:
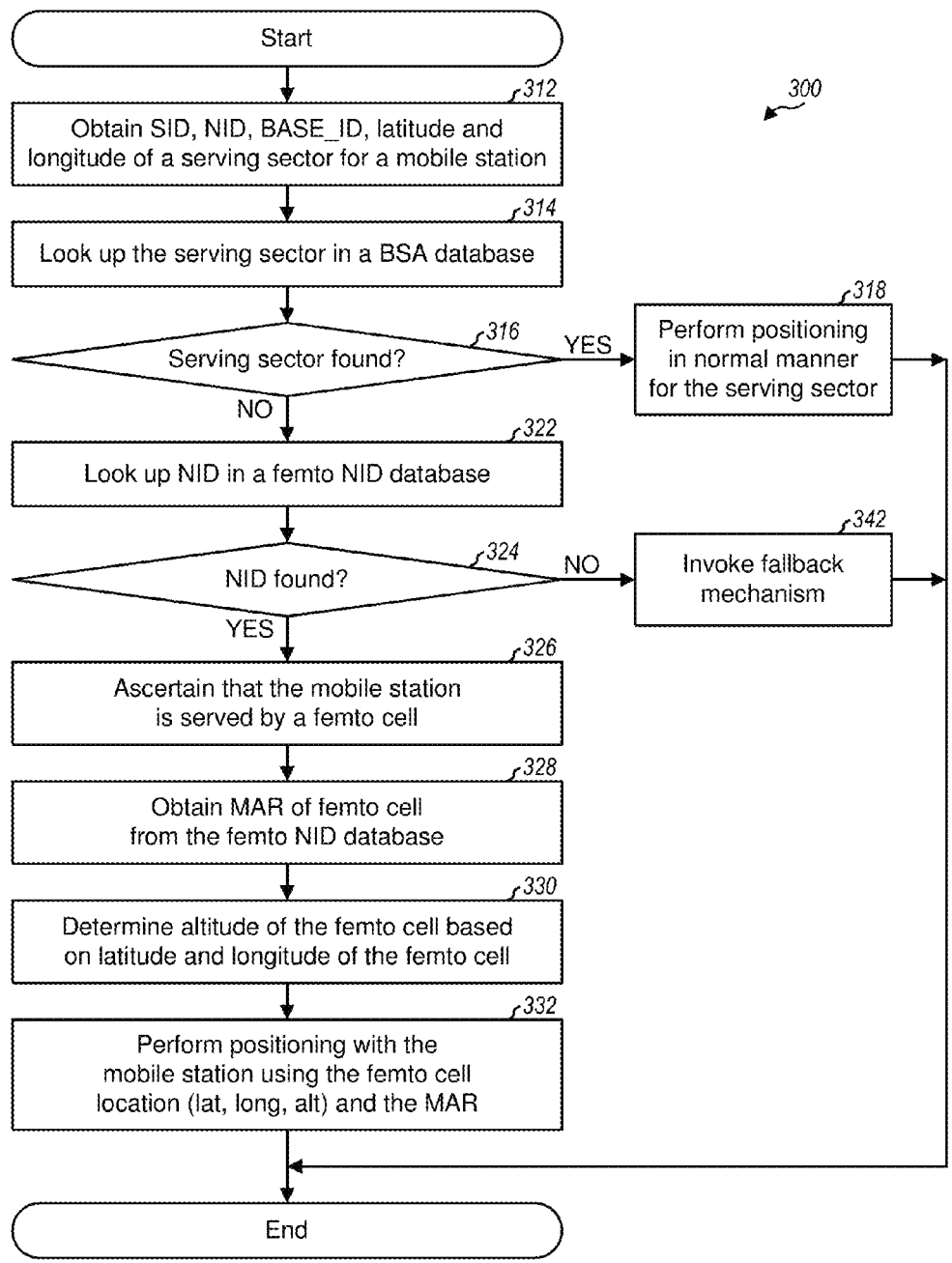
FIG. 3 shows a process performed by a location server to support positioning.

FIG. 3 shows a design of a process 300 performed by PDE 130 to support positioning of mobile stations served by femto cells. PDE 130 may receive a Provide Advanced System Parameters Information message from mobile station 110 and may extract the SID, NID and BASE_ID of a serving sector for mobile station 110 as well as the latitude and longitude of the serving sector from the received message (block 312). PDE 130 may perform a normal lookup of BSA database 132 with the SID, NID and BASE_ID (block 314). If the BSA lookup is successful and the serving sector is found in BSA database 132, as determined in block 316, then PDE 130 may perform normal positioning processing (block 318). The serving sector may be found in BSA database 132 if the SID, NID and BASE_ID are for a provisioned sector or cell.

However, if the BSA lookup is unsuccessful, then PDE 130 may look up the NID of the serving sector in femto NID database 134 (block 322). For block 322, PDE 130 may compare the NID reported by mobile station 110 against the NID ranges stored in femto NID database 134 to determine whether the NID is within one of the NID ranges reserved for femto cells.

If the reported NID is within one of the NID ranges, as determined in block 324, then PDE 130 can ascertain that mobile station 110 is served by a femto cell (block 326). PDE 130 may then use the latitude and longitude reported by mobile station 110 for the femto cell antenna location. PDE 130 may obtain the MAR associated with the reported NID from femto NID database 134 (block 328). PDE 130 may also determine the altitude (e.g., height above ellipsoid) of the femto cell by performing a lookup in a terrain elevation database for the reported femto cell location (block 330). PDE 130 may then perform positioning with mobile station 110 using (i) the antenna location given by the latitude, longitude, and altitude of the femto cell and (ii) the MAR (block 332). For example, the antenna location and the MAR may be provided as an initial location estimate. This initial location estimate may be used to provide GPS assistance data to mobile station 110, to determine search windows for visible GPS satellites, and/or for other purposes. Full GPS or A-FLT processing may be performed, and the resulting location estimate horizontal error position estimate (HEPE) may be compared against the femto cell MAR to determine the most accurate final location estimate to report.

Back in block 324, if the reported NID is not found in femto NID database 134, then PDE 130 may invoke a fallback mechanism to handle this situation (block 342). The process may terminate after blocks 318, 332 or 342.

Figure 4:
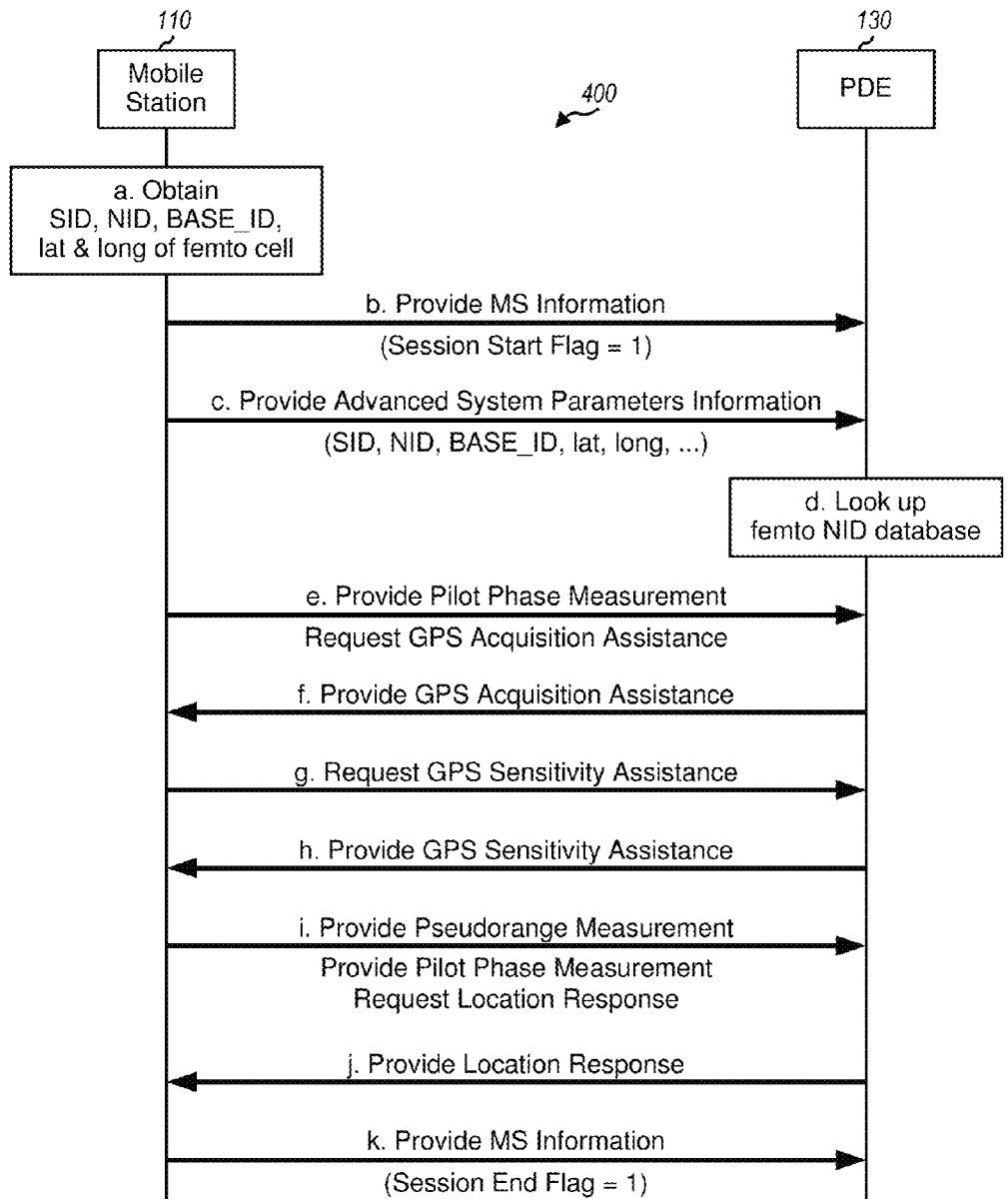
FIG. 4 shows a call flow for mobile-originated MS-assisted positioning.

FIG. 4 shows a design of a call flow 400 for mobile-originated MS-assisted positioning. Mobile station 110 may initially obtain identification information (e.g., SID, NID, and BASE_ID) and location (e.g., latitude and longitude) of femto cell 120, e.g., via a System Parameters Message transmitted by femto cell 120 (step a). Mobile station 110 may send a Provide MS Information message with its positioning capabilities and with a Session Start flag set to 1 to PDE 130 (step b). Mobile station 110 may also send a Provide Advanced System Parameters Information message with the identification information and location of femto cell 120 to PDE 130 (step c).

PDE 130 may receive the messages from mobile station 110. PDE 130 may determine that the NID received from mobile station 110 in step c is present in femto NID database 134 (step d). Step d may be performed as shown in FIG. 3. PDE 130 may determine the MAR of femto cell 120 based on the NID, as described above for FIG. 3. PDE 130 may also determine the altitude of femto cell 120 based on the latitude and longitude of femto cell 120. PDE 130 may use the location (e.g., latitude, longitude, and possibly altitude) of femto cell 120 as an initial location estimate.

Mobile station 110 may measure pilot phases of visible base stations in a neighbor list and may send a Provide Pilot Phase Measurement message with pilot phase measurement data to PDE 130 (step e). Mobile station 110 may also send a Request GPS Acquisition Assistance message to request for acquisition assistance data (also step e). PDE 130 may compute search windows for visible GPS satellites based on this initial location estimate and the MAR of femto cell 120. PDE 130 may send a Provide GPS Acquisition Assistance message with the search windows and/or other acquisition assistance data to mobile station 110 (step f).

Mobile station 110 may send a Request GPS Sensitivity Assistance message to ask for assistance to detect weak satellites (step g). PDE 130 may then return a Provide GPS Sensitivity Assistance message with sensitivity assistance data to mobile station 110 (step h). Mobile station 110 may use the sensitivity assistance data to continue measuring pseudo-ranges and may also re-measure the pilot phases of visible base stations.

Mobile station 110 may send a Provide Pseudorange Measurement message with pseudo-range measurement data to PDE 130 (step i). Mobile station 110 may also send (i) a Provide Pilot Phase Measurement message with pilot phase measurement data, (ii) a Request Location Response message to request for a location estimate, and/or (iii) other messages to PDE 130 (also step i).

PDE 130 may compute a final location estimate for mobile station 110 based on the initial location estimate determined by PDE 130 and the measurement data received from mobile station 110. If the measurements from mobile station 110 are insufficient to determine a better location estimate, then PDE 130 may use the initial location estimate as the final location estimate. In any case, PDE 130 may send a Provide Location Response message with the final location estimate to mobile station 110 (step j). Mobile station 110 may send to PDE 130 a Provide MS Information message with a Session End flag set to 1 to terminate the location session (step k).

Figure 5:
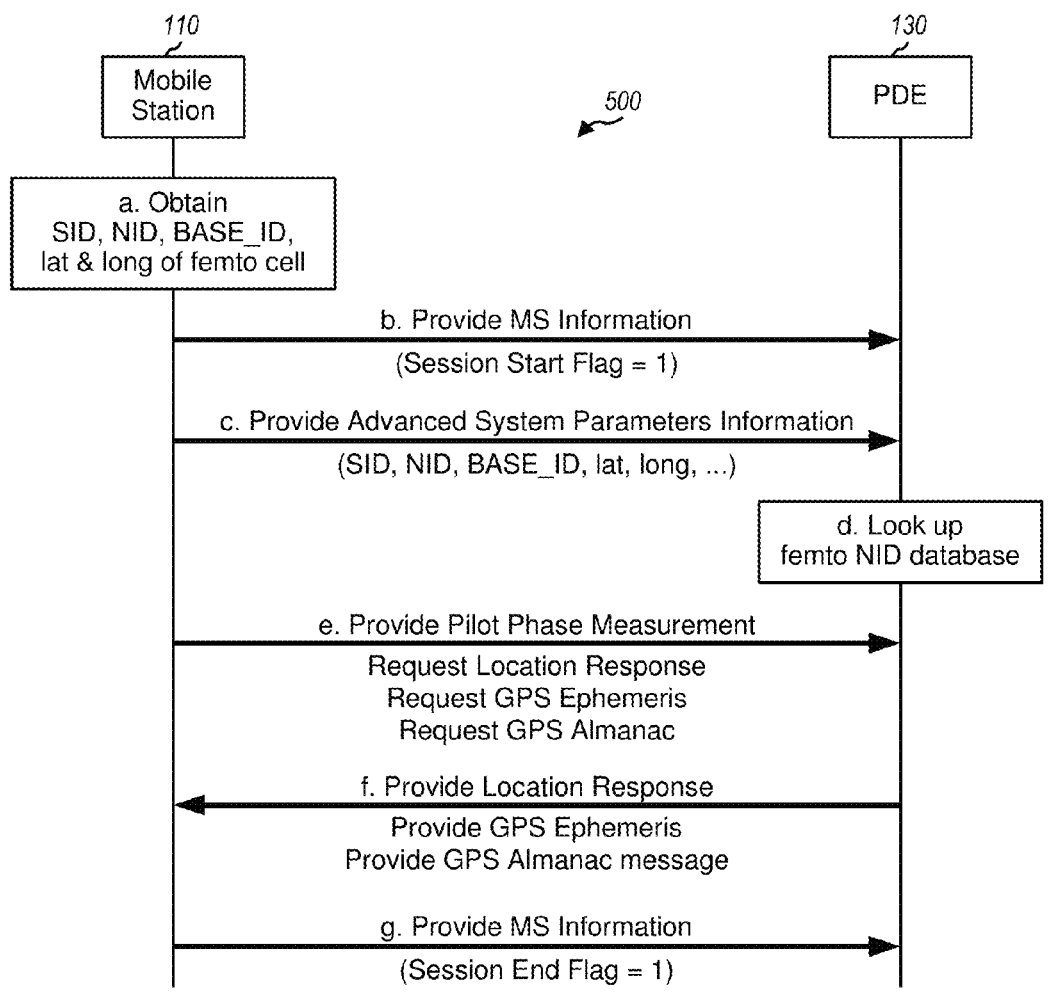
FIG. 5 shows a call flow for mobile-originated MS-based positioning.

FIG. 5 shows a design of a call flow 500 for mobile-originated MS-based positioning. Mobile station 110 may initially obtain identification information (e.g., SID, NID, and BASE_ID) and location (e.g., latitude and longitude) of femto cell 120 (step a). Mobile station 110 may send a Provide MS Information message with its positioning capabilities and with a Session Start flag set to 1 to PDE 130 (step b). Mobile station 110 may also send a Provide Advanced System Parameters Information message with the identification information and location of femto cell 120 to PDE 130 (step c).

PDE 130 may receive the messages from mobile station 110. PDE 130 may determine that the NID received from mobile station 110 in step c is present in femto NID database 134 (step d). PDE 130 may determine the MAR of femto cell 120 based on the NID, as described above. PDE 130 may also determine the altitude of femto cell 120 based on the latitude and longitude of femto cell 120. PDE 130 may use the location (e.g., latitude, longitude, and possibly altitude) of femto cell 120 as an initial location estimate.

Mobile station 110 may measure the pilot phases of visible base stations in a neighbor list and may send a Provide Pilot Phase Measurement message with pilot phase measurement data to PDE 130 (step e). Alternatively, mobile station 110 may send a reference pseudo-random number (PN) to PDE 130, which may then provide a sector-center location estimate. Mobile station 110 may also send (i) a Request Location Response message to ask for an initial location estimate, (ii) a Request GPS Ephemeris message to ask for GPS ephemeris data, (iii) a Request GPS Almanac message to ask for GPS almanac data, and/or (iv) other messages to PDE 130 (also step e). PDE 130 may determine appropriate ephemeris and almanac data based on the initial location estimate. PDE 130 may then send (i) a Provide Location Response message with the initial location estimate, (ii) a Provide GPS Ephemeris message with the ephemeris data, and (iii) a Provide GPS Almanac message with the almanac data to mobile station 110 (step f). Mobile station 110 may send to PDE 130 a Provide MS Information message with a Session End flag set to 1 to terminate the location session (step g).

Call flow 400 in FIG. 4 may be used to obtain a location estimate for mobile station 110. Call flow 500 in FIG. 5 may be used whenever mobile station 110 needs to refresh its ephemeris and/or almanac data. Other call flows may also be defined to support positioning of a mobile station communicating with a femto cell.

The description above assumes that femto cell 120 can determine its location and can transmit its latitude and longitude to mobile stations, as supported in 3GPP2. Mobile station 110 may then send the latitude and longitude of femto cell 120 to PDE 130. Femto cell 120 may not be able to transmit its latitude and longitude to mobile stations, e.g., due to lack of suitable message fields in 3GPP networks. This limitation may be addressed in various manners. In one design, PDE 130 may engage in a location session with femto cell 120 to determine the location of the femto cell. In another design, a coarse location estimate may be obtained for femto cell 120 based on identification information for femto cell 120. In yet another design, a default location may be used for femto cell 120 to provide assistance data to mobile station 110.

Mobile station 110 may send a specially assigned identity of femto cell 120 to PDE 130 to allow PDE 130 to detect the cell as a femto cell. The specially assigned identity may also be used to convey other information for femto cell 120, e.g., the MAR, etc.

The techniques described herein can overcome the lack of a priori knowledge of the location of a femto cell for positioning of a mobile station. The femto cell can transmit its location to the mobile station (if the radio technology or air interface supports such functionality) for use by the mobile station, including allowing the mobile station to forward the femto cell location to a location server. If such functionality is not supported by the radio technology, then the location server may engage in a location session with the femto cell to determine the femto cell location. The location server may also query a database for the location of the femto cell if the mobile station does not provide such information.

The femto cell may be assigned a special value for a selected identity. The selected identity may be any suitable identity supported by the radio technology. Different identities may be selected for use in different radio technologies, e.g., the NID may be used in CDMA 1X. The special value may be within a reserved range of values and may implicitly transfer knowledge such as coverage area, location uncertainty, transmit power level, and/or other parameter for the femto cell. The selected identity may be transmitted by the femto cell to the mobile station, which may use and/or forward the identity to the location server. The location server may receive the femto cell location and the selected identity. The location server may use this information to support positioning of the mobile station, e.g., to provide assistance data or to compute a location estimate for the mobile station.

The techniques described herein may be used to support positioning of mobile stations served by femto cells, as described. The techniques may also be used to support positioning of mobile stations served by base stations, access points, and/or other stations for which a priori knowledge of their locations is not available.

The techniques described herein may be used to support positioning via user plane and control plane solutions. A user plane or control plane solution may include various network elements, interfaces, protocols, procedures, and messages to support positioning and location services. In a user plane solution, messages supporting positioning and location services may be carried as part of data transferred between network entities and a mobile station, typically with standard data protocols such as Transmission Control Protocol (TCP) and Internet Protocol (IP). In a control plane solution, messages supporting positioning and location services may be carried as part of signaling transferred between network entities and between a network entity and a mobile station, typically with network-specific protocols, interfaces, and signaling messages. Some exemplary user plane solutions include SUPL from OMA, X.S0024 from 3GPP2, and V1 and V2 from CDMA Development Group (CDG). Some exemplary control plane solutions include IS-881 and X.S0002 from 3GPP2 and TS 23.271, TS 43.059, and TS 25.305 from 3GPP.

Figure 6:
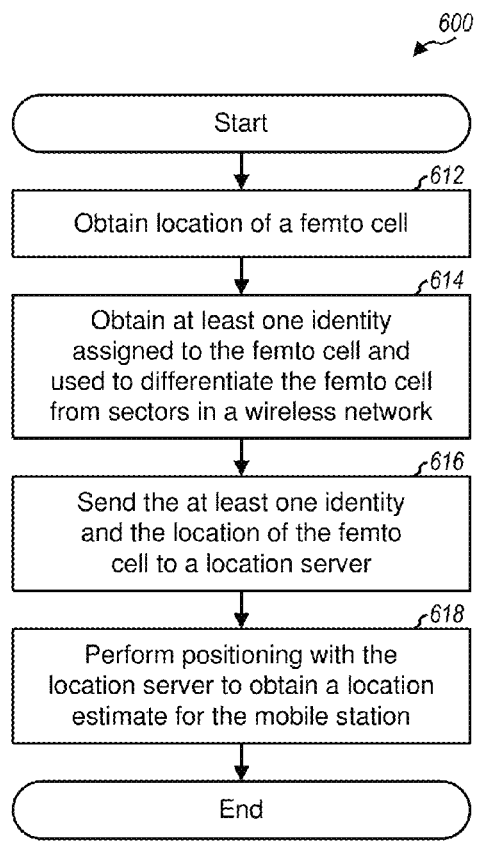
FIG. 6 shows a process for performing positioning by a mobile station.

FIG. 6 shows a design of a process 600 for performing positioning. Process 600 may be performed by a mobile station (as described below) or by some other entity. The mobile station may obtain the location of a femto cell (block 612). The mobile station may also obtain at least one identity (e.g., a NID) assigned to the femto cell and used to differentiate the femto cell from sectors in a wireless network (block 614). The sectors may also be referred to as cells. In one design, the mobile station may receive an overhead message (e.g., a System Parameters Message) transmitted by the femto cell and may obtain the at least one identity and the location of the femto cell from the overhead message. The mobile station may also obtain the at least one identity and the location of the femto cell in other manners.

The mobile station may send the at least one identity and the location of the femto cell to a location server (block 616). The mobile station may thereafter perform positioning with the location server to obtain a location estimate for the mobile station (block 618). The location server may differentiate the femto cell from the sectors in the wireless network based on the at least one identity. Positioning may be performed based on the location of the femto cell and other information (e.g., a MAR) obtained based on the at least one identity of the femto cell. In one design of block 618, the mobile station may receive assistance data, which may be determined by the location server based on the location of the femto cell. In another design, the mobile station may send pseudo-range measurements to the location server and may receive a location estimate, which may be determined by the location server based on the location of the femto cell and the pseudo-range measurements. The mobile station may also perform other tasks for positioning.

Figure 7:
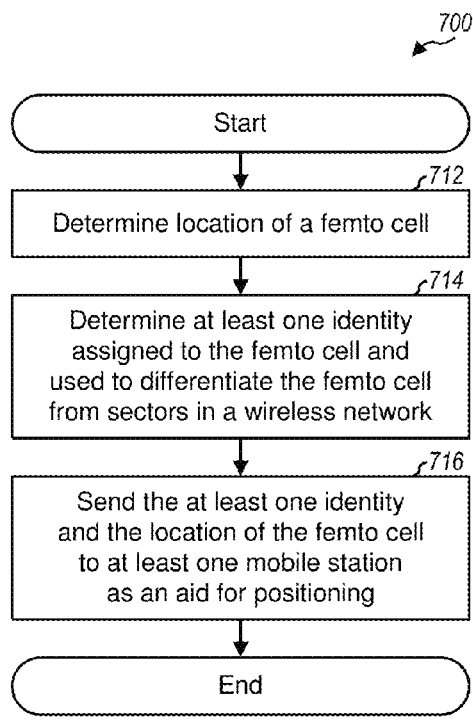
FIG. 7 shows a process for supporting positioning by a femto cell.

FIG. 7 shows a design of a process 700 for supporting positioning. Process 700 may be performed by a femto cell (as described below) or by some other entity. The femto cell may determine its location, e.g., based on signals from satellites in an SPS (block 712). The femto cell may also determine at least one identity assigned to the femto cell and used to differentiate the femto cell from sectors in a wireless network (block 714). The femto cell may send the at least one identity and its location (e.g., in an overhead message such as a System Parameters Message) to at least one mobile station as an aid for positioning (block 716).

In one design, the at least one identity may comprise an identity (e.g., a NID) having a value within a range of values reserved for femto cells. The femto cell may be differentiated from the sectors in the wireless network based on the value of the identity. In another design, the at least one identity may comprise an identity having a value within one of multiple ranges of values, with each range of values being reserved for femto cells of a different type. The femto cell may be differentiated from the sectors in the wireless network and the type of the femto cell may be determined based on the value of the identity. In one design, each range of values may be associated with a particular MAR for femto cells assigned with values in the range. The identity may also convey other information for the femto cell.

In one design, the at least one identity may comprise (i) a NID used in 3GPP2. In other designs, the at least one identity may comprise a SID and/or a BASE_ID used in 3GPP2, (ii) an MCC, an MNC, a LAC, and/or a CID used in GSM, (iii) an MCC, an MNC, an RNC-ID, and/or a CID used in WCDMA, or (iv) some other identities.

Figure 8:
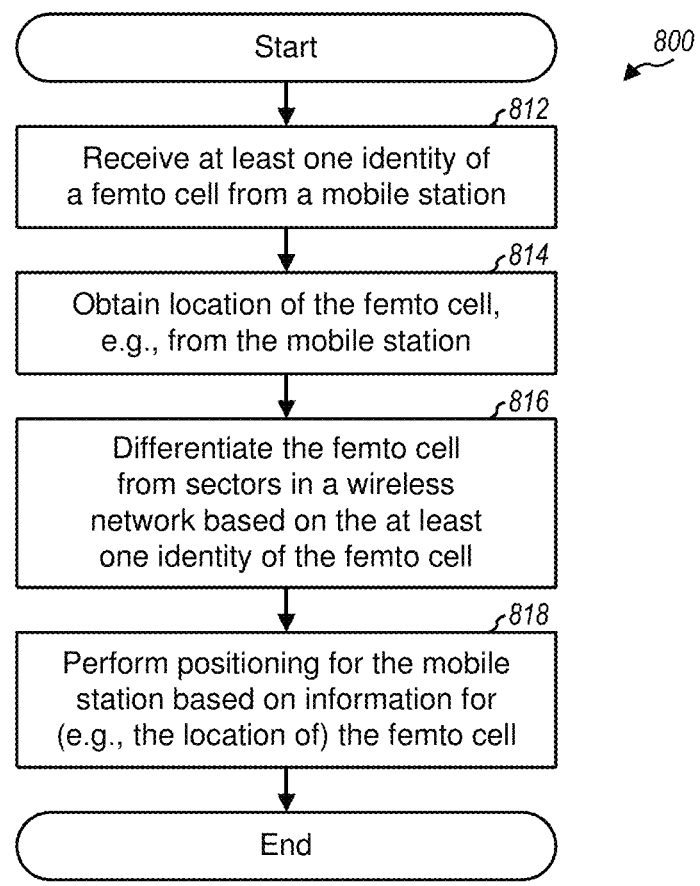
FIG. 8 shows a process for supporting positioning by a location server.

FIG. 8 shows a design of a process 800 for supporting positioning. Process 800 may be performed by a location server (e.g., a PDE) or by some other entity. The location server may receive at least one identity of a femto cell from a mobile station (block 812). The location server may also obtain the location of the femto cell, e.g., from the mobile station (block 814). The location server may also obtain the location of the femto cell by performing positioning with the femto cell or by looking up a database based on the at least one identity. The location server may differentiate the femto cell from sectors in a wireless network based on the at least one identity of the femto cell (block 816). The location server may then perform positioning for the mobile station based on information for (e.g., the location of) the femto cell (block 818).

In one design, the at least one identity may comprise an identity (e.g., a NID) having a value within a range of values reserved for femto cells. The location server may identify the femto cell as being a femto cell based on the value of the identity being within the range of values. In another design, the at least one identity may comprise an identity having a value within one of multiple ranges of values, with each range of values being reserved for femto cells of a different type. The location server may identify the femto cell as being of a particular femto cell type based on the value of the identity.

In one design, the location of the femto cell may comprise a latitude and a longitude. The location server may determine an altitude of the femto cell based on the latitude and longitude of the femto cell. The location server may then perform positioning based further on the altitude of the femto cell. In one design, the location server may determine a MAR of the femto cell based on the at least one identity of the femto cell. The location server may perform positioning based further on the MAR.

In one design of block 818, the location server may determine assistance data for the mobile station based on the location of the femto cell and may send the assistance data to the mobile station. In another design, the location server may receive pseudo-range measurements from the mobile station and may determine a location estimate for the mobile station based on the location of the femto cell and the pseudo-range measurements. The location server may then send the location estimate to the mobile station. The location server may also perform other tasks for positioning.

Figure 9:
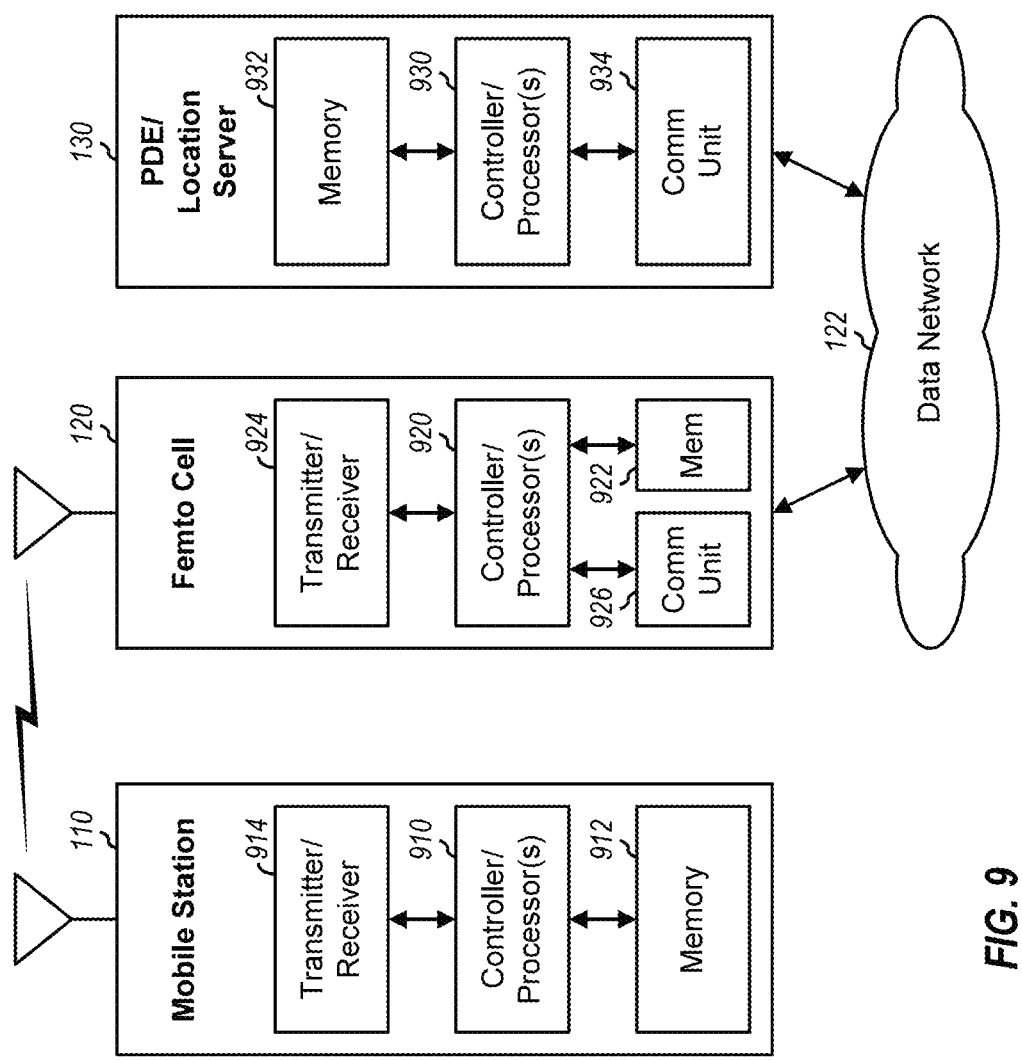
FIG. 9 shows a block diagram of the mobile station, the femto cell, and the location server.

FIG. 9 shows a block diagram of a design of mobile station 110, femto cell 120, and PDE/location server 130 in FIG. 1. For simplicity, FIG. 9 shows one or more controller/processor(s) 910, one memory 912, and one transmitter/receiver 914 for mobile station 110, one or more controller/processor(s) 920, one memory (Mem) 922, one transmitter/receiver 924, and one communication (Comm) unit 926 for femto cell 120, and one or more controller/processor(s) 930, one memory 932, and one communication (Comm) unit 934 for PDE 130. In general, each entity may include any number of processing units (e.g., controllers, processors, etc.), memories, transmitters, receivers, communication units, etc.

On the downlink, femto cell 120 may transmit traffic data, signaling (e.g., overhead messages such as System Parameters Message), and pilot to mobile stations within its coverage area. These various types of information may be processed by processing unit 920, conditioned by transmitter 924, and transmitted on the downlink. At mobile station 110, the downlink signal from femto cell 120 may be received and conditioned by receiver 914 and further processed by processing unit 910 to obtain various types of information. Processing unit 910 may also perform or direct process 600 in FIG. 6 and/or other processes for the techniques described herein. Processing unit 910 may also perform processing for mobile station 110 in FIGS. 2, 4 and 5. Memory 912 may store program codes and data for mobile station 110. On the uplink, mobile station 110 may transmit traffic data, signaling, and pilot to femto cell 120. These various types of information may be processed by processing unit 910, conditioned by transmitter 914, and transmitted on the uplink. At femto cell 120, the uplink signal from mobile station 110 may be received and conditioned by receiver 924 and further processed by processing unit 920 to obtain various types of information from mobile station 110. Processing unit 920 may also perform or direct process 700 in FIG. 7 and/or other processes for the techniques described herein. Processing unit 920 may also perform the processing for femto cell 120 in FIG. 2. Memory 922 may store program codes and data for femto cell 120. Femto cell 120 may communicate with other entities, e.g., in data network 122, via communication unit 926.

Mobile station 110 may also receive and process signals from satellites. The satellite signals may be received by receiver 914 and processed by processing unit 910 to obtain pseudo-ranges for the satellites. Processing unit 910 may compute a location estimate for mobile station 110 based on the pseudo-ranges. Processing unit 910 may also provide the pseudo-ranges and/or satellite measurements to PDE 130, which may compute the location estimate for mobile station 110.

Within PDE 130, processing unit 930 may perform processing to support positioning and location services for mobile stations. For example, processing unit 930 may perform or direct process 300 in FIG. 3, process 800 in FIG. 8, and/or other processes for the techniques described herein. Processing unit 930 may also perform the processing for PDE 130 in FIGS. 2, 4 and 5. Processing unit 930 may also compute a location estimate for mobile station 110, provide assistance data, provide location information to LBS clients, etc. Memory 932 may store program codes and data for PDE 130. Communication unit 934 may allow PDE 130 to communicate with mobile station 110 and/or other entities, e.g., in data network 122.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

A mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer program code, or combinations of both. To clearly illustrate this interchangeability of hardware and program code, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable medium may take the form of a computer program product. Computer-readable medium includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of positioning, comprising:
    receiving, at a mobile station, an at least one identity of a femto cell, wherein the at least one identity of the femto cell comprises at least one of a plurality of identities for femto cells;
    sending the at least one identity of the femto cell to a location server;
    receiving one or more positioning assistance messages from the location server, wherein the one or more positioning assistance messages are generated in response to the at least one identity of the femto cell; and
    performing positioning based at least in part on the one or more positioning assistance messages received from the location server.

2. The method of claim 1, wherein the at least one identity of the femto cell comprises a value within a plurality of ranges of values reserved femto cells, and further comprising:
    differentiating the femto cell from sectors in a wireless network based on the at least one identity of the femto cell, wherein a range of values in the plurality of ranges of values is reserved for femto cells of a different type, and a type of the femto cell is determined based on the value of the at least one identity of the femto cell.

3. The method of claim 1,
    wherein the one or more positioning assistance messages comprise a femto network identification database obtained based on the at least one identity of the femto cell.

4. The method of claim 1, further comprising:
    obtaining a location of the femto cell, and wherein positioning is performed based further on the location of the femto cell.

5. The method of claim 4,
    wherein the location of the femto cell is obtained from the mobile station, by performing positioning with the femto cell, or by querying a database based on the at least one identity of the femto cell.

6. The method of claim 4, further comprising:
    determining a maximum antenna range of the femto cell based on the at least one identity of the femto cell, and wherein positioning is performed based further on the maximum antenna range of the femto cell.

7. The method of claim 4, wherein the location of the femto cell comprises a latitude and a longitude, the method further comprising:
    determining an altitude of the femto cell based on the latitude and the longitude of the femto cell, and wherein positioning is performed based further on the altitude of the femto cell.

8. The method of claim 4, wherein the performing positioning further comprises:
    obtaining pseudo-range measurements with respect to the femto cell at the mobile station; and
    determining a location estimate based on the location of the femto cell and the pseudo-range measurements.

9. An apparatus for use in performing positioning, the apparatus comprising:

at least one processing unit configured to
obtain an at least one identity of a femto cell, wherein the at least one identity of the femto cell comprises at least one of a plurality of identities for femto cells;
send the at least one identity of the femto cell to a location server;
obtain one or more positioning assistance messages from the location server, wherein the one or more positioning assistance messages are generated in response to the at least one identity of the femto cell; and
perform positioning based at least in part on the one or more positioning assistance messages received from the location server.

10. The apparatus of claim 9, wherein the at least one identity of the femto cell comprises a value within a plurality of ranges of values reserved femto cells, and wherein the at least one processing unit is further configured to:
differentiate the femto cell from sectors in a wireless network based on the at least one identity of the femto cell, wherein a range of values in the plurality of ranges of values is reserved for femto cells of a different type, and a type of the femto cell is determined based on the value of the at least one identity of the femto cell.

11. The apparatus of claim 9,
wherein the one or more positioning assistance messages comprise a femto network identification database obtained based on the at least one identity of the femto cell.

12. The apparatus of claim 9, wherein the at least one processing unit is further configured to:
obtain a location of the femto cell, and wherein positioning is performed based further on the location of the femto cell.

13. The apparatus of claim 12,
wherein the location of the femto cell is based on positioning performed with the femto cell, or querying of a database based on the at least one identity of the femto cell.

14. The apparatus of claim 12,
wherein the at least one processing unit is further configured to determine a maximum antenna range of the femto cell based on the at least one identity of the femto cell, and wherein positioning is performed based further on the maximum antenna range of the femto cell.

15. The apparatus of claim 12, wherein the location of the femto cell comprises a latitude and a longitude, and wherein the at least one processing unit is further configured to:
determine an altitude of the femto cell based on the latitude and the longitude of the femto cell, and wherein positioning is performed based further on the altitude of the femto cell.

16. The apparatus of claim 12, wherein the at least one processing unit is further configured to:
obtain pseudo-range measurements with respect to the femto cell at the apparatus; and
determine a location estimate based on the location of the femto cell and the pseudo-range measurements.

17. A non-transitory computer program product, comprising:
a non-transitory computer-readable medium comprising:
code to cause at least one processing unit to obtain an at least one identity of a femto cell at a mobile station, wherein the at least one identity of the femto cell comprises at least one of a plurality of identities for femto cells;
code to cause the at least one processing unit to initiate transmission of the at least one identity of the femto cell to a location server;
code to cause the at least one processing unit to obtain one or more positioning assistance messages from the location server, wherein the one or more positioning assistance messages are generated in response to the at least one identity of the femto cell; and
code to cause the at least one processing unit to perform positioning based at least in part on the one or more positioning assistance messages received from the location server.

18. The non-transitory computer program product of claim 17, wherein the at least one identity of the femto cell comprises a value within a plurality of ranges of values reserved femto cells, and further comprising:
code to cause the at least one processing unit to differentiate the femto cell from sectors in a wireless network based on the at least one identity of the femto cell, wherein a range of values in the plurality of ranges of values is reserved for femto cells of a different type, and a type of the femto cell is determined based on the value of the at least one identity of the femto cell.

19. The non-transitory computer program product of claim 17,
wherein one or more the positioning assistance messages comprise a femto network identification database obtained based on the at least one identity of the femto cell.

20. The non-transitory computer program product of claim 17, further comprising:
code to cause the at least one processing unit to obtain a location of the femto cell, and wherein positioning is performed based further on the location of the femto cell.

21. The non-transitory computer program product of claim 20,
wherein the location of the femto cell is based on positioning performed with the femto cell, or querying of a database based on the at least one identity of the femto cell.

22. The non-transitory computer program product of claim 20, further comprising:
code to cause the at least one processing unit to determine a maximum antenna range of the femto cell based on the at least one identity of the femto cell, and wherein positioning is performed based further on the maximum antenna range of the femto cell.

23. The non-transitory computer program product of claim 20, wherein the location of the femto cell comprises a latitude and a longitude, the non-transitory computer program product further comprising:
code to cause the at least one processing unit to determine an altitude of the femto cell based on the latitude and the longitude of the femto cell, and wherein positioning is performed based further on the altitude of the femto cell.

24. An apparatus for performing positioning, comprising:
means for receiving an at least one identity of a femto cell, wherein the at least one identity of the femto cell comprises at least one of a plurality of identities for femto cells;
means for sending the at least one identity of the femto cell to a location server;

means for receiving one or more positioning assistance messages from the location server, wherein the one or more positioning assistance messages are generated in response to the at least one identity of the femto cell; and means for performing positioning based at least in part on the one or more positioning assistance messages received from the location server.

25. The apparatus of claim 24, wherein the at least one identity of the femto cell comprises a value within a plurality of ranges of values reserved femto cells, and further comprising:

means for differentiating the femto cell from sectors in a wireless network based on the at least one identity of the femto cell, wherein a range of values in the plurality of ranges of values is reserved for femto cells of a different type, and a type of the femto cell is determined based on the value of the at least one identity of the femto cell.

26. The apparatus of claim 24, wherein the one or more positioning assistance messages comprise a femto network identification database obtained based on the at least one identity of the femto cell.

27. The apparatus of claim 24, further comprising:

means for obtaining a location of the femto cell, and wherein positioning is performed based further on the location of the femto cell.

28. The apparatus of claim 27, wherein the location of the femto cell is based on positioning performed with the femto cell, or querying of a database based on the at least one identity of the femto cell.

29. The apparatus of claim 27, further comprising:

means for determining a maximum antenna range of the femto cell based on the at least one identity of the femto cell, and wherein positioning is performed based further on the maximum antenna range of the femto cell.

30. The apparatus of claim 27, wherein the location of the femto cell comprises a latitude and a longitude, the apparatus further comprising:

means for determining an altitude of the femto cell based on the latitude and the longitude of the femto cell, and wherein positioning is performed based further on the altitude of the femto cell.

\* \* \* \* \*